US012651971B2

(12) United States Patent

Yang et al.

(10) Patent No.: US 12,651,971 B2

(45) Date of Patent: Jun. 9, 2026

(54) ACTIVE CLAMP FLYBACK CONVERTER WITH ACCURATE CURRENT SENSE AND THE METHOD THEREOF

(71) Applicant: Chengdu Monolithic Power Systems Co., Ltd., Chengdu (CN)

(72) Inventors: Kun Yang, Hangzhou (CN); Naixing Kuang, Hangzhou (CN); Kai Wang, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 259 days.

(21) Appl. No.: 18/509,839

(22) Filed: Nov. 15, 2023

(65) Prior Publication Data

US 2024/0171081 A1     May 23, 2024

(30) Foreign Application Priority Data

Nov. 21, 2022    (CN) .......................... 202211455634.7

(51) Int. Cl.
| | |
|---|---|
| *H02M 3/335* | (2006.01) |
| *H02M 1/00* | (2006.01) |
| *H02M 1/08* | (2006.01) |
| *H02M 1/34* | (2007.01) |

(52) U.S. Cl.
CPC ..... *H02M 3/33569* (2013.01); *H02M 1/0006* (2021.05); *H02M 1/08* (2013.01); *H02M 1/342* (2021.05)

(58) Field of Classification Search
CPC ............. H02M 3/33569; H02M 1/342; H02M 1/0006; H02M 1/08; Y02B 70/10
See application file for complete search history.

(56) References Cited

U.S. PATENT DOCUMENTS

| | | | | |
|---|---|---|---|---|
| 10,461,653 | B1* | 10/2019 | Wong ................ | H02M 3/33569 |
| 2018/0287481 | A1* | 10/2018 | Liu ................... | H02M 3/33569 |
| 2018/0301975 | A1* | 10/2018 | Lin .................... | H02M 3/33569 |
| 2019/0013739 | A1* | 1/2019 | Hari .................. | H02M 3/33569 |
| 2020/0395863 | A1* | 12/2020 | Song ................. | H02M 3/33507 |
| 2021/0194378 | A1* | 6/2021 | Tian .................. | H02M 3/33592 |
| 2022/0069718 | A1* | 3/2022 | Xu .................... | H02M 3/33569 |
| 2023/0231486 | A1 | 7/2023 | Chen et al. | |

FOREIGN PATENT DOCUMENTS

| | | | | | |
|---|---|---|---|---|---|
| CN | 110611431 | B | * | 6/2020 | ........ H02M 3/33523 |
| CN | 113098280 | A | * | 7/2021 | ............ H02M 7/217 |
| CN | 111585441 | B | * | 6/2022 | ........ H02M 3/33569 |

* cited by examiner

*Primary Examiner* — Monica Lewis
*Assistant Examiner* — Jye-June Lee
(74) *Attorney, Agent, or Firm* — Perkins Coie LLP

(57) ABSTRACT

An active clamp flyback converter with accurate sense of an output voltage is discussed. The active clamp flyback converter adopts a feedback voltage generator which generates a feedback voltage in response to an input voltage, a voltage at a switch node, an auxiliary control signal, and a current signal indicative of a current flowing through a primary winding.

11 Claims, 4 Drawing Sheets

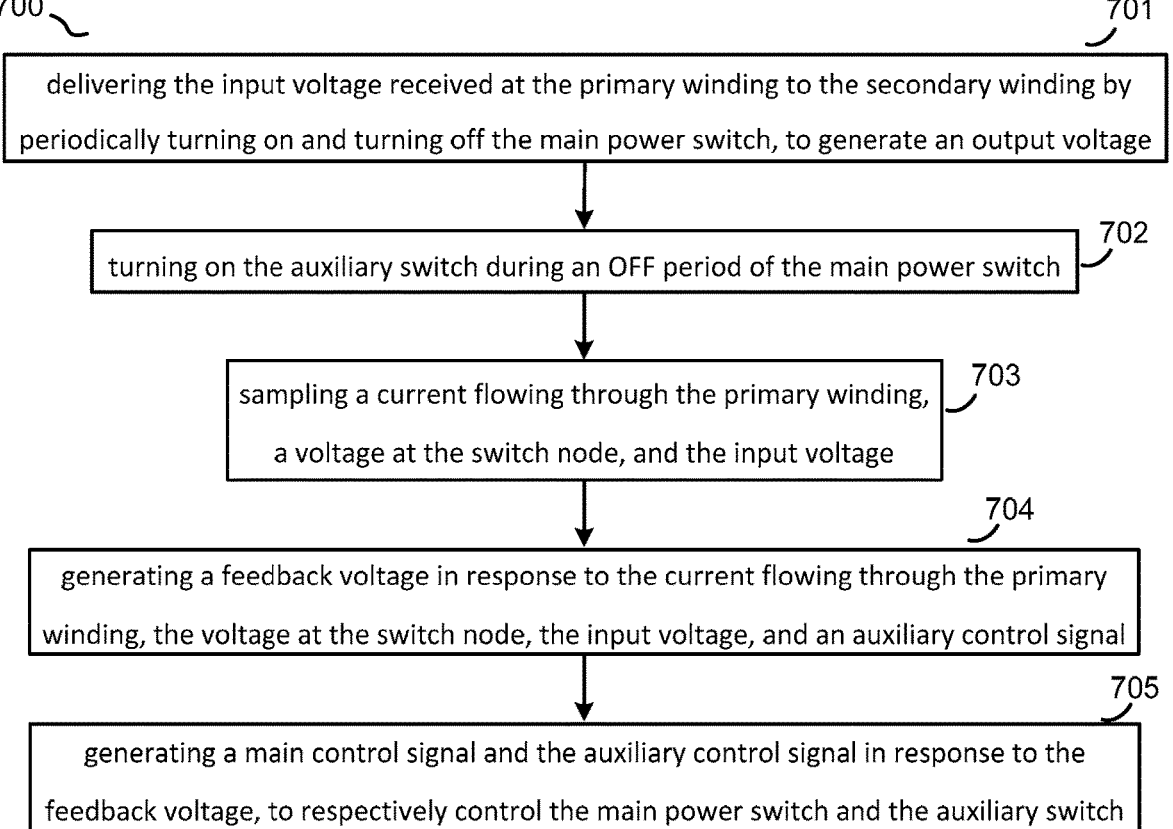

700

701 delivering the input voltage received at the primary winding to the secondary winding by periodically turning on and turning off the main power switch, to generate an output voltage

702 turning on the auxiliary switch during an OFF period of the main power switch

703 sampling a current flowing through the primary winding, a voltage at the switch node, and the input voltage

704 generating a feedback voltage in response to the current flowing through the primary winding, the voltage at the switch node, the input voltage, and an auxiliary control signal

705 generating a main control signal and the auxiliary control signal in response to the feedback voltage, to respectively control the main power switch and the auxiliary switch

Figure 7

ACTIVE CLAMP FLYBACK CONVERTER WITH ACCURATE CURRENT SENSE AND THE METHOD THEREOF

CROSS-REFERENCE TO RELATED APPLICATIONS

This application claims priority to and the benefit of Chinese Patent Application No. 202211455634.7, filed Nov. 21, 2022, which is incorporated herein by reference in its entirety.

BACKGROUND OF THE INVENTION

Active clamp flyback converters are widely used in galvanically isolated fields, because of the high efficiency and low EMI (electro-magnetic interference). The so-called active clamp flyback converter refers to a flyback converter that having an auxiliary switch and an absorb capacitor in the primary side besides the main power switch. As shown in FIG. 1, the active flyback converter comprises a main power switch S1 and an auxiliary switch S2, coupled to a primary winding T1 of a transformer T. The auxiliary switch S2 may be OFF during the ON duration of the main power switch S1, and may keep ON during the OFF duration of the main power switch S1, i.e., the two switches are turned on complementary. Alternatively, the auxiliary switch S2 may be OFF during the ON duration of the main power switch S1, and may be ON for a period of time during the OFF duration of the main power switch S1. When the main power switch S1 is turned off, an energy in the leakage inductance of the transformer T1 is transferred to an absorb capacitor C1. Because the auxiliary switch S2 is ON, the absorb capacitor C1 will reversely charge the leakage inductance after the current flowing through the primary side falls to zero. Thus, the energy absorbed by the absorb capacitor C1 is restored to the leakage inductance and released to the load, which improves the efficiency.

Due to the isolation of the input and the output, an opotocoupler, an isolated capacitor or an auxiliary winding is needed under primary side control condition to feed back the output voltage. However, these approaches have defects such as lifespan and high cost.

Some prior arts may directly sample the primary voltage of the transformer and obtain the output voltage according to the turn ratio of the transformer. But this approach does not consider the influence of the leakage inductance, resulting in poor load regulation, especially in light load.

SUMMARY OF THE INVENTION

In accordance with an embodiment of the present invention, an active clamp flyback converter is discussed. The active clamp flyback converter comprises: a transformer, a main power switch, an auxiliary switch, a feedback voltage generator and a controller. The transformer is configured to receive an input voltage, and includes a primary winding, a secondary winding, and a leakage inductance. The main power switch is coupled between the primary winding and a primary reference ground. An electrical connection of the main power switch and the primary winding forms a switch node. The auxiliary switch is coupled between the switch node and the input voltage. The feedback voltage generator is configured to generate a feedback voltage in response to the input voltage, a voltage at the switch node, an auxiliary control signal, and a current signal indicative of a current flowing through the primary winding. The controller is configured to generate a main control signal and the auxiliary control signal in response to the feedback voltage, to respectively control the main power switch and the auxiliary switch.

In addition, in accordance with an embodiment of the present invention, a feedback voltage generator used in an active clamp flyback converter is discussed. The active clamp flyback converter includes: a main power switch coupled between a primary winding and a primary reference ground, and an auxiliary switch coupled between a switch node and an input voltage. The switch node is formed by an electrical connection of the main power switch and the primary winding. The feedback voltage generator comprises: a first sample & hold circuit, a second sample & hold circuit, and an operational circuit. The first sample & hold circuit is configured to sample and hold a current signal indicative of a current flowing through the primary winding when the auxiliary switch is turned on for a first time length, to generate a first hold signal. The second sample & hold circuit is configured to sample and hold the current signal when the auxiliary switch is turned on for a second time length, to generate a second hold signal. The operational circuit is configured to perform a multiplication operation on an inductance value of a leakage inductance of the primary winding, a difference between the first hold signal and the second hold signal, and a reciprocal of a time difference between the first time length and the second time length. The multiplication result is then added by a voltage at the switch node, and is subtracted by the input voltage, to generate a feedback voltage.

Furthermore, in accordance with an embodiment of the present invention, a method used in an active clamp flyback converter is discussed. The active clamp flyback converter includes: a transformer, a main power switch coupled between a primary winding and a primary reference ground, and an auxiliary switch coupled between a switch node and an input voltage. The transformer has the primary winding, a second winding and a leakage inductance. The switch node is formed by an electrical connection of the main power switch and the primary winding. The method comprises: delivering the input voltage received at the primary winding to the secondary winding by periodically turning on and turning off the main power switch, to generate an output voltage; turning on the auxiliary switch during an OFF period of the main power switch; sampling a current flowing through the primary winding, a voltage at the switch node, and the input voltage; generating a feedback voltage in response to the current flowing through the primary winding, the voltage at the switch node, the input voltage, and an auxiliary control signal; and generating a main control signal and the auxiliary control signal in response to the feedback voltage, to respectively control the main power switch and the auxiliary switch.

BRIEF DESCRIPTION OF DRAWINGS

FIG. 7 schematically shows a flowchart 700 of a method used in an active clamp flyback converter in accordance with an embodiment of the present invention.

DETAILED DESCRIPTION OF THE INVENTION

Embodiments of circuits for composite switch are described in detail herein. In the following description, some specific details, such as example circuits for these circuit components, are included to provide a thorough understanding of embodiments of the invention. One skilled in relevant art will recognize, however, that the invention can be practiced without one or more specific details, or with other methods, components, materials, etc.

The following embodiments and aspects are illustrated in conjunction with circuits and methods that are meant to be exemplary and illustrative. In various embodiments, the above problem has been reduced or eliminated, while other embodiments are directed to other improvements.

Figure 1:
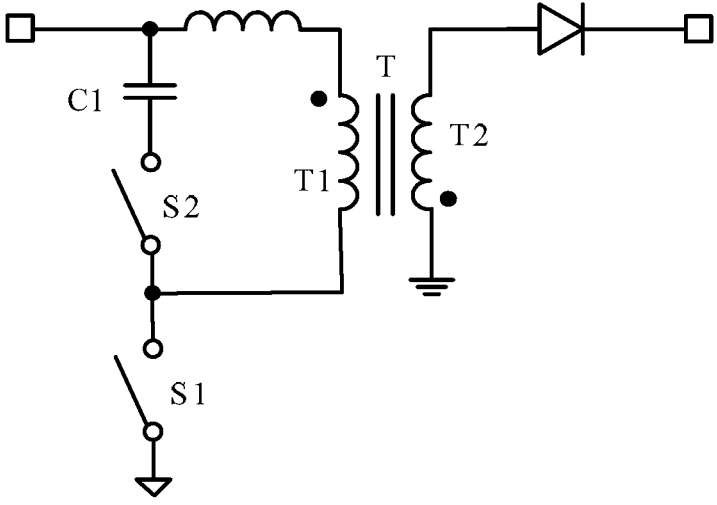
FIG. 1 schematically shows a typical active clamp flyback converter in the prior art.
Figure 2:
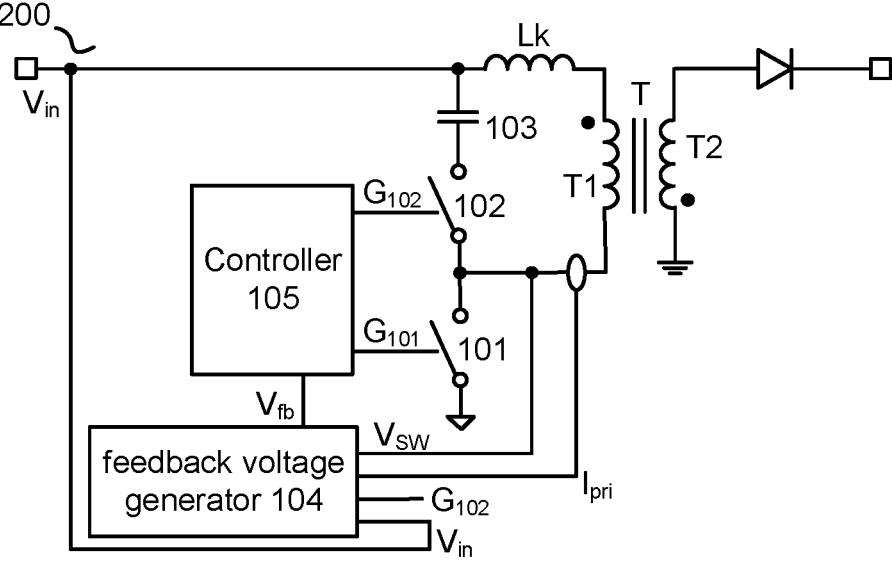
FIG. 2 schematically shows an active clamp flyback converter 200 in accordance with an embodiment of the present invention.

FIG. 2 schematically shows an active clamp flyback converter 200 in accordance with an embodiment of the present invention. In the example of FIG. 2, the active clamp flyback converter 200 comprises: a transformer T, configured to receive an input voltage $V_{in}$. The transformer T includes a primary winding T1, a secondary winding T2, and a leakage inductance Lk, which is equalized as being coupled in series with the primary winding T1. The active clamp flyback converter 200 further comprises: a main power switch 101, an auxiliary switch 102, an auxiliary capacitor 103, a feedback voltage generator 104, and a controller 105. The main power switch 101 is coupled between the primary winding and a primary reference ground. An electrical connection of the main power switch 101 and the primary winding T1 forms a switch node SW. The auxiliary switch 102 and the auxiliary capacitor 103 are coupled in series between the switch node SW and the input voltage $V_{in}$. The feedback voltage generator 104 is configured to generate a feedback voltage $V_{fb}$ in response to the input voltage $V_{in}$, a voltage $V_{SW}$ at the switch node SW, an auxiliary control signal $G_{102}$, and a current signal $I_{pri}$ indicative of a current flowing through the primary winding T1. The controller 105 is configured to generate a main control signal $G_{101}$ and the auxiliary control signal $G_{102}$ in response to the feedback voltage $V_{fb}$, to respectively control the main power switch 101 and the auxiliary switch 102.

In one embodiment of the present invention, the main control signal $G_{101}$ and the auxiliary control signal $G_{102}$ may be complementary. In other embodiments of the present invention, there may exist a certain dead time between the main control signal $G_{101}$ and the auxiliary control signal $G_{102}$.

In the example of FIG. 2, the active clamp flyback converter 200 further comprises: a diode, coupled to the secondary winding T2, to provide an output voltage. In other embodiments of the present invention, the diode may be replace by a controllable power switch (e.g. a synchronous rectifier), to improve the efficiency.

Figure 3:
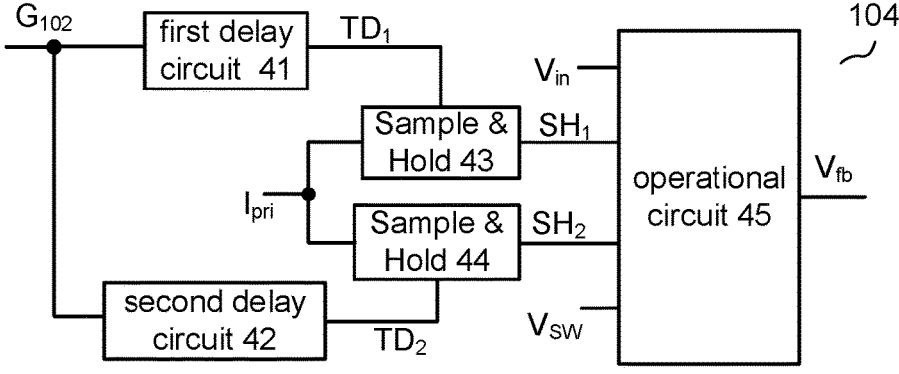
FIG. 3 schematically shows a circuit configuration of the feedback voltage generator 104 in accordance with an embodiment of the present invention.

FIG. 3 schematically shows a circuit configuration of the feedback voltage generator 104 in accordance with an embodiment of the present invention. In the example of FIG.

3, the feedback voltage generator 104 comprises: a first delay circuit 41, a second delay circuit 42, a first sample & hold circuit 43, a second sample & hold circuit 44 and an operational circuit 45. The first delay circuit 41 is configured to postpone the auxiliary control signal $G_{102}$ with a first time length $t_1$, to generate a first delay signal $TD_1$. The second delay circuit 42 is configured to postpone the auxiliary control signal $G_{102}$ with a second time length $t_2$, to generate a second delay signal $TD_2$. The first sample & hold circuit 43 is configured to sample and hold the current signal $I_{pri}$ in response to the first delay signal $TD_1$, to generate a first hold signal $SH_1$. The second sample & hold circuit 44 is configured to sample and hold the current signal $I_{pri}$ in response to the second delay signal $TD_2$, to generate a second hold signal $SH_2$. The operational circuit 45 is configured to perform a multiplication operation on an inductance value $L_{lk}$ of the leakage inductance, a difference $(SH_2-SH_1)$ between the first hold signal $SH_1$ and the second hold signal $SH_2$, and a reciprocal of a time difference $(1/(t_2-t_1))$ between the time length $t_1$ and the second time length $t_2$. A multiplication result is then added by the voltage $V_{SW}$ at the switch node SW, and is subtracted by the input voltage $V_{in}$, to generate the feedback voltage $V_{fb}$. That is, the feedback voltage $V_{fb}$ has a following relationship with the inputs of the operational circuit 45:

$$V_{fb}=(SH_2-SH_1)\times L_{lk}/(t_2-t_1)+V_{SW}-V_{in}$$

In one embodiment of the present invention, the first time length $t_1$ is shorter than the second time length $t_2$.

In one embodiment of the present invention, the operational circuit 45 may be realized by digital circuits. In other embodiments of the present invention, the operational circuit 45 may be realized by analog circuits.

Figure 4:
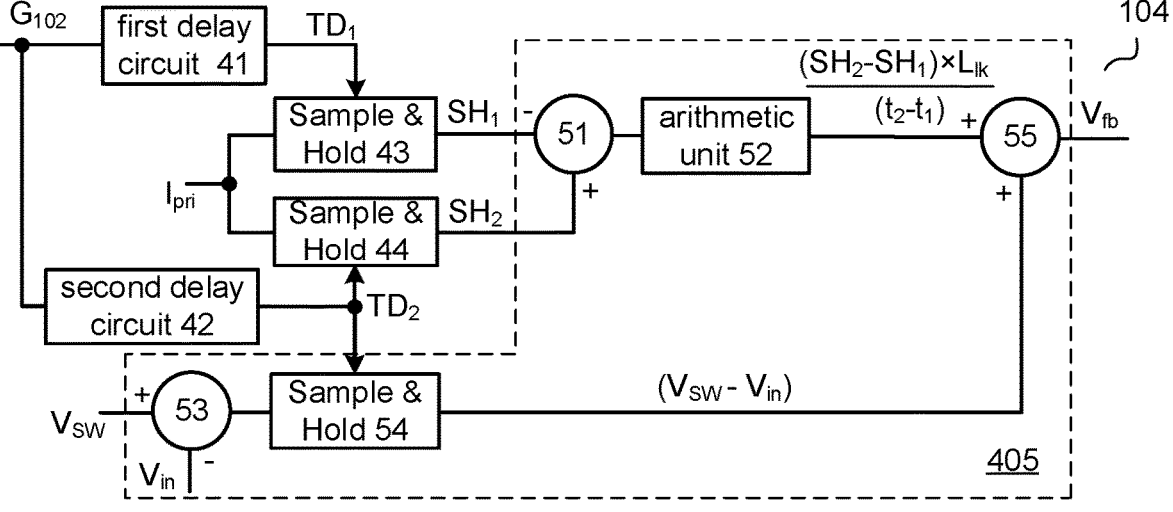
FIG. 4 schematically shows a circuit configuration of the operational circuit 45 in accordance with an embodiment of the present invention.

FIG. 4 schematically shows a circuit configuration of the operational circuit 45 in accordance with an embodiment of the present invention. In the example of FIG. 4, the operational circuit 45 comprises: a first arithmetic unit 51, a second arithmetic unit 52, a third arithmetic unit 53, a third sample & hold circuit 54, and a fourth arithmetic unit 55. The first arithmetic unit 51 is configured to perform a subtract operation on the first hold signal $SH_1$ and the second hold signal $SH_2$. The second arithmetic unit 52 is configured to perform the multiplication operation on the inductance value $L_{lk}$ of the leakage inductance, the difference between the first hold signal $SH_1$ and the second hold signal $SH_2$, and the reciprocal of the time difference between the first time length $t_1$ and the second time length $t_2$, to generate a multiplication signal $(SH_2-SH_1)\times L_{lk}/(t_2-t_1)$. The third arithmetic unit 53 is configured to perform the subtract operation on the voltage $V_{SW}$ at the switch node SW and the input voltage $V_{in}$. The third sample & hold circuit 54 is configured to sample and hold a difference of the voltage $V_{SW}$ at the switch node SW and the input voltage $V_{in}$ in response to the second delay signal $TD_2$, to generate a difference hold signal $(V_{SW}-V_{in})$. The fourth arithmetic unit 55 is configured to perform an add operation on the difference hold signal $(V_{SW}-V_{in})$ and the multiplication signal $(SH_2-SH_1)\times L_{lk}/(t_2-t_1)$, to generate the feedback voltage $V_{fb}$.

Figure 5:
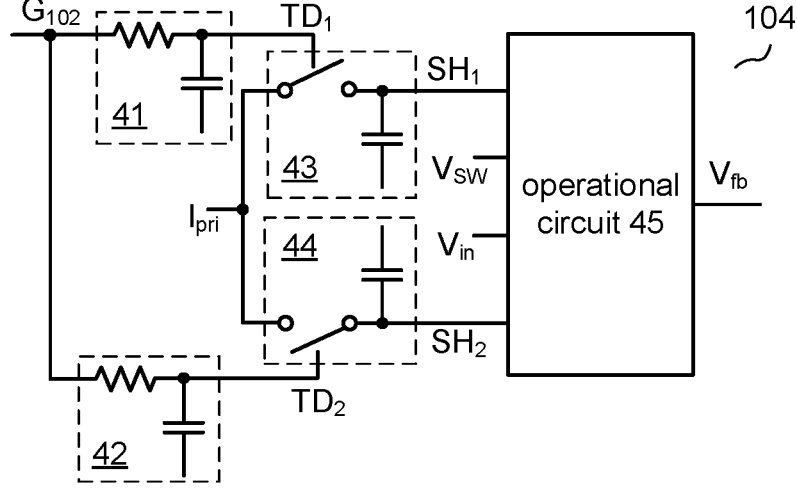
FIG. 5 schematically shows a circuit configuration of the feedback voltage generator 104 in accordance with an embodiment of the present invention.

FIG. 5 schematically shows a circuit configuration of the feedback voltage generator 104 in accordance with an embodiment of the present invention. In the example of FIG. 5, the first delay circuit 41 and the second delay circuit 42 are both realized by RC circuits (i.e., a resistor and a capacitor). The first sample & hold circuit 43 and the second sample & hold circuit 44 are both realized by a sample switch and a sample capacitor.

During the operation of the active clamp flyback converter, when the main power switch 101 is turned off and the auxiliary switch 102 is turned on, a voltage $V_{T1}$ across the primary winding T1 is a sum of a voltage $V_{103}$ across the auxiliary capacitor 103 and a voltage $V_{LK}$ across the leakage inductance Lk, that is: $V_{T1}=V_{103}+V_{Lk}$.

The voltage $V_{103}$ across the auxiliary capacitor 103 at the ON duration of the auxiliary switch 102 is a difference between the voltage $V_{SW}$ at the switch node SW and the input voltage $V_{in}$. That is, $V_{103}=V_{SW}-V_{in}$.

The output voltage $V_O$ has a following relationship with the voltage $V_{T1}$ across the primary winding T1:

$$V_O=V_{T1}\times N_S/N_P$$

Wherein $N_S/N_P$ is a turn ratio of the primary winding T1 and the secondary winding T2.

Thus, the output voltage $V_O$ is obtained as long as the voltage Vik across the leakage inductance is known.

At the feedback voltage generator 104, the current signal $I_{pri}$ is sampled and held as the first hold signal $SH_1$ by the first delay circuit 41 and the first sample & hold circuit 43 when the auxiliary switch 102 is ON for the first time length $t_1$. And the current signal $I_{pri}$ is sampled and held as the second hold signal $SH_2$ by the second delay circuit 42 and the second sample & hold circuit 44 when the auxiliary switch 102 is ON for the second time length $t_2$. Then the operational circuit 45 performs the multiplication operation on the inductance value $L_{lk}$ of the leakage inductance, the difference between the first hold signal $SH_1$ and the second hold signal $SH_2$, and the reciprocal of the time difference between the time length $t_1$ and the second time length $t_2$. According to the relationship between the voltage across the inductor and the inductor current, it is known that the multiplication signal $(SH_2-SH_1)\times L_{lk}/(t_2-t_1)$ is the voltage $V_{LK}$ across the leakage inductance Lk.

Thus, the feedback voltage generator 104 in FIG. 3 realizes the accurate sense of the output voltage. The sensed output voltage information is then delivered to the controller 105, to generate the main control signal $G_{101}$ and the auxiliary control signal $G_{102}$, which is used to respectively control the main power switch 101 and the auxiliary switch 102.

Figure 6:
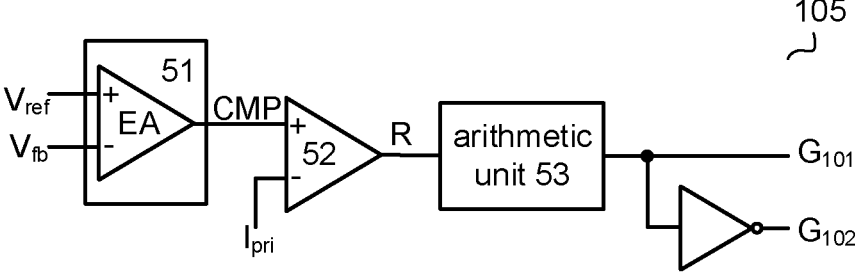
FIG. 6 schematically shows a circuit configuration of the controller 105 in accordance with an embodiment of the present invention.

FIG. 6 schematically shows a circuit configuration of the controller 105 in accordance with an embodiment of the present invention. In the example of FIG. 6, the controller 105 comprises: a proportional integral circuit (e.g. an error amplifier EA) 51, a comparator 52, and a logical circuit 53. The proportional integral circuit 51 is configured to amplify and integrate a difference between the feedback voltage $V_{fb}$ and a reference voltage $V_{ref}$ to generate a compensation signal CMP. The comparator 52 is configured to compare the compensation signal CMP with the current signal $I_{pri}$ to generate a reset signal R. The logical circuit 53 is configured to generate the main control signal $G_{101}$ in response to the reset signal R, to control the main power switch 101. The auxiliary switch 102 is turned on after the main power switch 101 is turned off with a dead time delay.

In one embodiment of the present invention, the main control signal $G_{101}$ is converted to the auxiliary control signal $G_{102}$ via an inverter, to control the auxiliary switch 102.

The controller 105 shown in FIG. 6 realizes one of the closed loop controls. However, one skilled in the art should realize that the control circuit may comprise other circuits to realize different control schemes, such as single voltage loop control, peak current control, average current control, etc.

FIG. 7 schematically shows a flowchart 700 of a method used in an active clamp flyback converter in accordance with an embodiment of the present invention. The active clamp flyback converter includes: a transformer, a main power switch coupled between a primary winding and a primary reference ground, and an auxiliary switch coupled between a switch node and an input voltage. The transformer has the primary winding, a second winding and a leakage inductance. The switch node is formed by an electrical connection of the main power switch and the primary winding. The method comprises:

Step 701, delivering the input voltage received at the primary winding to the secondary winding by periodically turning on and turning off the main power switch, to generate an output voltage.

Step 702, turning on the auxiliary switch during an OFF period of the main power switch.

Step 703, sampling a current flowing through the primary winding, a voltage at the switch node, and the input voltage.

Step 704, generating a feedback voltage in response to the current flowing through the primary winding, the voltage at the switch node, the input voltage, and an auxiliary control signal. And Step 705, generating a main control signal and the auxiliary control signal in response to the feedback voltage, to respectively control the main power switch and the auxiliary switch.

In one embodiment of the present invention, the method further comprises: postponing the auxiliary control signal with a first time length, to generate a first delay signal; sampling and holding the current flowing through the primary winding in response to the first delay signal, to generate a first hold signal; postponing the auxiliary control signal with a second time length, to generate a second delay signal; sampling and holding the current flowing through the primary winding in response to the second delay signal, to generate a second hold signal; performing a multiplication operation on an inductance value of the leakage inductance, a difference between the first hold signal and the second hold signal, and a reciprocal of a time difference between the first time length and the second time length, to generate a multiplication signal; and generating the feedback voltage by adding the voltage at the switch node to the multiplication signal and subtracting the input voltage from the multiplication signal.

In one embodiment of the present invention, the step of generating a main control signal and the auxiliary control signal in response to the feedback voltage comprises: amplifying and integrating a difference between the feedback voltage and a reference voltage, to generate a compensation signal; comparing the compensation signal with a current signal indicative of the current flowing through the primary winding to generate a reset signal; and generating the main control signal and the auxiliary control signal in response to the reset signal.

It is to be understood in these letters patent that the meaning of "A" is coupled to "B" is that either A and B are connected to each other as described below, or that, although A and B may not be connected to each other as described above, there is nevertheless a device or circuit that is connected to both A and B. This device or circuit may include active or passive circuit elements, where the passive circuit elements may be distributed or lumped-parameter in nature. For example, A may be connected to a circuit element that in turn is connected to B.

This written description uses examples to disclose the invention, including the best mode, and also to enable a person skilled in the art to make and use the invention. The patentable scope of the invention may include other examples that occur to those skilled in the art.

The invention claimed is:

1. An active clamp flyback converter, comprising:

a transformer, configured to receive an input voltage, the transformer including a primary winding, a secondary winding, and a leakage inductance;

a main power switch, coupled between the primary winding and a primary reference ground, an electrical connection of the main power switch and the primary winding forming a switch node;

an auxiliary switch, coupled between the switch node and the input voltage;

a feedback voltage generator, configured to generate a feedback voltage in response to the input voltage, a voltage at the switch node, an auxiliary control signal, and a current signal indicative of a current flowing through the primary winding; and a controller, configured to generate a main control signal and the auxiliary control signal in response to the feedback voltage, to respectively control the main power switch and the auxiliary switch; wherein the feedback voltage generator comprises:

a first sample & hold circuit, configured to sample and hold the current signal when the auxiliary switch is turned on for a first time length, to generate a first hold signal;

a second sample & hold circuit, configured to sample and hold the current signal when the auxiliary switch is turned on for a second time length, to generate a second hold signal; and an operational circuit, configured to perform a multiplication operation on an inductance value of the leakage inductance, a difference between the first hold signal and the second hold signal, and a reciprocal of a time difference between the first time length and the second time length, wherein a multiplication result is added to the voltage at the switch node, and is subtracted by the input voltage, to generate the feedback voltage.

2. The active clamp flyback converter of claim 1, wherein the operational circuit comprises:

a first arithmetic unit, configured to perform a subtraction on the first hold signal and the second hold signal;

a second arithmetic unit, configured to perform the multiplication operation on the inductance value of the leakage inductance, the difference between the first hold signal and the second hold signal, and the reciprocal of the time difference between the first time length and the second time length, to generate a multiplication signal;

a third arithmetic unit, configured to perform the subtract operation on the voltage at the switch node and the input voltage;

a third sample & hold circuit, configured to sample and hold a difference of the voltage at the switch node and the input voltage when the auxiliary switch is turned on for the second time length, to generate a difference hold signal; and a fourth arithmetic unit, configured to perform an add operation on the difference hold signal and the multiplication signal, to generate the feedback voltage.

3. The active clamp flyback converter of claim 1, wherein the feedback voltage generator further comprises:

a first delay circuit, configured to postpone the auxiliary control signal with the first time length, to generate a first delay signal;

a second delay circuit, configured to postpone the auxiliary control signal with the second time length, to generate a second delay signal.

4. The active clamp flyback converter of claim 1, wherein the controller comprises:

a proportional integral circuit, configured to amplify and integrate a difference between the feedback voltage and a reference voltage, to generate a compensation signal;

a comparator, configured to compare the compensation signal with the current signal, to generate a reset signal; and a logical circuit, configured to generate the main control signal in response to the reset signal.

5. The active clamp flyback converter of claim 1, wherein:

the auxiliary switch is turned on after the main power switch is turned off with a dead time delay.

6. A feedback voltage generator used in an active clamp flyback converter, the active clamp flyback converter including: a main power switch coupled between a primary winding and a primary reference ground, and an auxiliary switch coupled between a switch node and an input voltage, the switch node being formed by an electrical connection of the main power switch and the primary winding, the feedback voltage generator comprising:

a first sample & hold circuit, configured to sample and hold a current signal indicative of a current flowing through the primary winding when the auxiliary switch is turned on for a first time length, to generate a first hold signal;

a second sample & hold circuit, configured to sample and hold the current signal when the auxiliary switch is turned on for a second time length, to generate a second hold signal; and an operational circuit, configured to perform a multiplication operation on an inductance value of a leakage inductance of the primary winding, a difference between the first hold signal and the second hold signal, and a reciprocal of a time difference between the first time length and the second time length, wherein a multiplication result is added to a voltage at the switch node, and is subtracted by the input voltage, to generate a feedback voltage.

7. The feedback voltage generator of claim 6, wherein the operational circuit comprises:

a first arithmetic unit, configured to perform a subtraction on the first hold signal and the second hold signal;

a second arithmetic unit, configured to perform the multiplication operation on the inductance value of the leakage inductance, the difference between the first hold signal and the second hold signal, and the reciprocal of the time difference between the first time length and the second time length, to generate a multiplication signal;

a third arithmetic unit, configured to perform subtraction on the voltage at the switch node and the input voltage;

a third sample & hold circuit, configured to sample and hold a difference of the voltage at the switch node and the input voltage when the auxiliary switch is turned on for the second time length, to generate a difference hold signal; and a fourth arithmetic unit, configured to perform an add operation on the difference hold signal and the multiplication signal, to generate the feedback voltage.

8. The feedback voltage generator of claim 6, further comprising:

a first delay circuit, configured to postpone an auxiliary control signal with the first time length, to generate a first delay signal, wherein the first sample & hold circuit is configured to sample and hold the current signal in response to the first delay signal; and a second delay circuit, configured to postpone the auxiliary control signal with the second time length, to generate a second delay signal, wherein the second sample & hold circuit is configured to sample and hold the current signal in response to the second delay signal.

9. The feedback voltage generator of claim 6, wherein:

the feedback voltage is used to generate a main control signal and the auxiliary control signal, to respectively control the main power switch and the auxiliary switch.

10. A method used in an active clamp flyback converter, the active clamp flyback converter including: a transformer, a main power switch coupled between a primary winding and a primary reference ground, and an auxiliary switch coupled between a switch node and an input voltage, the transformer having the primary winding, a secondary winding and a leakage inductance, the switch node being formed by an electrical connection of the main power switch and the primary winding, the method comprising:

delivering the input voltage received at the primary winding to the secondary winding by periodically turning on and turning off the main power switch, to generate an output voltage;

turning on the auxiliary switch during an OFF period of the main power switch;

sampling a current flowing through the primary winding, a voltage at the switch node, and the input voltage;

generating a feedback voltage in response to the current flowing through the primary winding, the voltage at the switch node, the input voltage, and an auxiliary control signal;

generating a main control signal and the auxiliary control signal in response to the feedback voltage, to respectively control the main power switch and the auxiliary switch;

postponing the auxiliary control signal with a first time length, to generate a first delay signal;

sampling and holding the current flowing through the primary winding in response to the first delay signal, to generate a first hold signal;

postponing the auxiliary control signal with a second time length, to generate a second delay signal;

sampling and holding the current flowing through the primary winding in response to the second delay signal, to generate a second hold signal;

performing a multiplication operation on an inductance value of the leakage inductance, a difference between the first hold signal and the second hold signal, and a reciprocal of a time difference between the first time length and the second time length, to generate a multiplication signal; and generating the feedback voltage by adding the voltage at the switch node to the multiplication signal and subtracting the input voltage from the multiplication signal.

11. The method of claim 10, wherein the step of generating the main control signal and the auxiliary control signal in response to the feedback voltage comprises:

amplifying and integrating a difference between the feedback voltage and a reference voltage, to generate a compensation signal;

comparing the compensation signal with a current signal indicative of the current flowing through the primary winding to generate a reset signal; and generating the main control signal and the auxiliary control signal in response to the reset signal.

* * * * *